United States Patent
Heck et al.

(10) Patent No.: US 6,559,230 B2
(45) Date of Patent: May 6, 2003

(54) THERMOSETTING ETHYLENE/ALPHA-OLEFIN COMPOSITION AND SAFETY GLASS INTERLAYER FILM MADE FROM THE COMPOSITION

(75) Inventors: Henry G. Heck, Lake Jackson, TX (US); Douglas P. Waszeciak, Lake Jackson, TX (US)

(73) Assignee: DuPont Dow Elastomers L.L.C., Wilmington, DE (US)

( * ) Notice: Subject to any disclaimer, the term of this patent is extended or adjusted under 35 U.S.C. 154(b) by 0 days.

(21) Appl. No.: 09/960,427

(22) Filed: Sep. 21, 2001

(65) Prior Publication Data

US 2002/0099145 A1 Jul. 25, 2002

Related U.S. Application Data

(60) Provisional application No. 60/237,763, filed on Sep. 29, 2000.

(51) Int. Cl.$^7$ .......................... C08F 4/00; C08F 291/00; B32B 17/10
(52) U.S. Cl. ...................... 525/191; 525/222; 525/263; 525/273; 525/309; 525/221; 525/227; 428/441; 428/442; 428/483
(58) Field of Search ................................ 525/191, 222, 525/263, 273, 309, 221, 227; 428/441, 442, 483

(56) References Cited

U.S. PATENT DOCUMENTS

| | | | |
|---|---|---|---|
| 3,645,992 A | 2/1972 | Elston ...................... 260/80.78 |
| 4,798,081 A | 1/1989 | Hazlitt et al. .................. 73/53 |
| 4,874,814 A | 10/1989 | Cartier et al. .................. 525/61 |
| 5,055,438 A | 10/1991 | Canich ........................ 502/117 |
| 5,057,475 A | 10/1991 | Canich et al. ................ 502/104 |
| 5,064,802 A | 11/1991 | Stevens et al. .............. 502/155 |
| 5,089,321 A | 2/1992 | Chum et al. ................. 428/218 |
| 5,096,867 A | 3/1992 | Canich ........................ 502/103 |
| 5,132,380 A | 7/1992 | Stevens et al. .............. 526/126 |
| 5,231,106 A | 7/1993 | Knutsen et al. .............. 514/340 |
| 5,272,236 A | 12/1993 | Lai et al. .................. 526/348.5 |
| 5,278,272 A | 1/1994 | Lai et al. .................. 526/348.5 |
| 5,374,696 A | 12/1994 | Rosen et al. ................ 526/126 |
| 5,453,410 A | 9/1995 | Kolthammer et al. ....... 502/155 |
| 5,470,993 A | 11/1995 | Devore et al. ................ 556/11 |
| 5,632,835 A | 5/1997 | Niwa et al. |
| 5,792,560 A | 8/1998 | Friedman et al. ........... 428/441 |
| 6,005,053 A | 12/1999 | Parikh et al. |
| 6,087,431 A | 7/2000 | Uchida et al. |
| 6,096,148 A | 8/2000 | Kingma ..................... 156/107 |
| 6,417,271 B1 * | 7/2002 | Nishihara et al. ........... 525/100 |

FOREIGN PATENT DOCUMENTS

| | | | |
|---|---|---|---|
| EP | 0 416 815 A2 | 3/1991 | .......... C08F/10/00 |
| EP | 0 514 828 A1 | 11/1992 | ............. C07F/7/28 |
| WO | 95/26377 | 10/1995 | ............. C08J/5/18 |
| WO | 00/09331 | 2/2000 | .......... B32B/27/32 |

OTHER PUBLICATIONS

Dealy, *Rheometers for Molten Plastics*, pp. 97–99(1988).
Ramamurthy, A. V., *Wall Slip in Viscous Fluids and Influence of Materials of Construction*, Journal of Rheology, 30(2), pp. 337–357 (1986).
Randall, Rev. Macromol. Chem. Phys. C29 (2 & 3), pp. 285–297 (1989).
Rudin, A., *Measurement of Long–Chain Branch Frequency in Synthetic Polymers*, Modern methods of Polymer Characterization, pp. 103–112, 1991.
Shida, M., et al., *Correlation of Low Density Polyethylene Rheological Measurements with Optical and Processing Properties*, Polymer Engineering and Science, vol. 17, No. 11, pp. 769–774, 1977.
Wild, L., et al., *Determination of Branching Distributions in Polyethylene and Ethylene Copolymers*, Journal of Polymer Science: Polymer Physics Edition, vol. 20, pp. 441–455 1982).
Zimm, Bruno H., et al., *The Dimensions of Chain Molecules Containing Branches and Rings*, The Journal of Chemical Physics, vol. 17, No. 12, pp. 1301–1314, Dec., 1949.

* cited by examiner

Primary Examiner—James J. Seidleck
Assistant Examiner—Olga Asinovsky
(74) Attorney, Agent, or Firm—Whyte Hirschboeck Dudek SC

(57) ABSTRACT

Safety glass interlayers are prepared from a composition comprising:

A. A homogeneously linear or substantially linear ethylene/α-olefin interpolymer, e.g., ethylene/1-octene;

B. A coagent containing at least two vinyl groups, e.g., trimethyol propane tri(meth)acrylate; and C. A peroxide, e.g., Luperox™ 101.

The interlayer films exhibit an excellent combination of tear strength and clarity.

24 Claims, No Drawings

THERMOSETTING ETHYLENE/ALPHA-OLEFIN COMPOSITION AND SAFETY GLASS INTERLAYER FILM MADE FROM THE COMPOSITION

CROSS REFERENCE TO RELATED APPLICATION

This application claims the benefit of U.S. Provisional Application No. 60/237,763 filed Sep. 29, 2000.

FIELD OF THE INVENTION

This invention relates to thermosetting ethylene/α-olefin compositions. In one aspect, this invention relates to such compositions comprising an ethylene/α-olefin copolymer in combination with a compound containing multiple vinyl groups while in another aspect, this invention relates to a film made from the composition. In yet another aspect, this invention relates to safety glass in which the film made from the composition is used as an interlayer in a laminated safety glass.

BACKGROUND OF THE INVENTION

Laminated safety glass has been used in the windshields of automobiles and the windows of buildings since the late 1930's. Safety glass typically consists of two sheets of glass bonded together by an interlayer of polymer film. When this laminated structure or sandwich is impacted by a rock or other object, the interlayer acts to absorb some of the impact energy. If the energy is sufficient to break the first sheet of glass, the interlayer reduces the total energy transmitted to the second sheet and spreads the energy from the crack across a wider area. If the energy is sufficient to also crack the second sheet of glass, the interlayer becomes the only structural element left to resist penetration of the rock. Accordingly, the tear resistance of the polymer film from which the interlayer is made is a critical performance parameter. In addition, of course, the interlayer must have excellent transparency (i.e., low haze).

Plasticized polyvinyl butyral (PVB) has historically been the material of choice for the interlayer because of its combination of excellent clarity and tear resistance. At a thickness of 0.76 mm (30 mil), PVB yields a glass laminate with a haze of 0.3%, well below the 1% value typically required for architectural applications and even the 0.5% value required for automotive windshields. When tested by ASTM D-624, Method B, plasticized PVB yields a value of 50 kN/m. The denominator in this calculation is the thickness of the test specimen.

As excellent as plasticized PVB is for forming the interlayer of laminated safety glass, it is not without disadvantages. Plasticized PVB is moisture sensitive which requires the exercise of special precautions during manufacturing and use. Plasticized PVB also has an inherent tackiness which requires that it be shipped and stored refrigerated. Moreover, plasticized PVB becomes brittle at just below its glass transition temperature of 21 C. and this, in turn, decreases the penetration resistance of safety glass with a plasticized PVB interlayer at subambient temperatures.

One response to these disadvantages of plasticized PVB is an interlayer film based on a substantially linear, very-low or ultra-low density polyethylenic interpolymer and its blends and alloys as taught by Friedman, et al. in U.S. Pat. No. 5,792,560 which is incorporated herein by reference. Friedman, et al. teach that interlayer films made from these polyethylenic materials do not need a plasticizer because of the high impact, notch and tear resistance characteristics of the substantially linear ethylenic interpolymer. However, Friedman, et al. also teach that these interpolymers have relatively poor adhesion to substrates such as mineral glass and as such, are blended with a coupling agent such as vinyl triethoxysilane or amino propyl triethoxysilane. While the Friedman, et al. interlayer overcomes some of the disadvantages of plasticized PVB, e.g., films made from the Friedman, et al. compositions are less moisture sensitive and provide better tear resistance at subambient temperatures, the thickness of the film required to achieve commercial standards of tear resistance is such that the haze value does not meet commercial standards. In other words, in order to achieve an acceptable tear resistance, the thickness of the interlayer film must be increased to a point that the haze value of the film is unacceptable.

Accordingly, the industry still has an interest in the development of an interlayer film for safety glass that has the plasticized PVB combination of high tear strength and low haze properties without the plasticized PVB disadvantages of moisture sensitivity, tackiness and relatively poor tear resistance at subambient temperatures. In this regard, an interlayer film with a Tear Haze Index (THI) of 50 or more is desirable. For purposes of this invention, THI is defined as the tear strength measured according to ASTM D-624, Method B, reported in kN/m divided by the percent haze measured at 0.76 mm (30 mil) thickness. Plasticized PVB, with a tear strength of 50 kN/m and haze of 0.3 scores a THI of 167 (which is excellent). The minimum requirement for architectural safety glass is a tear strength of 50 kN/m and haze of 1%. This equates to a THI of 50. Automotive windshields with a haze requirement of less than 0.5% require a THI of at least 100.

SUMMARY OF THE INVENTION

According to this invention, films useful as an interlayer for safety glass are prepared from a thermosetting composition comprising, in weight percent based upon the total weight of the composition:

A. about 90 to about 98 percent of a homogeneously linear or substantially linear ethylene/α-olefin interpolymer with a crystallinity of about 10 percent or more;

B. about 2 to about 10 percent of a coagent containing at least two vinyl groups; and C. at least an initiating amount of an organic peroxide.

Films made from these compositions have an improved THI relative to films made (i) from compositions substantially similar in all respects except for the co-agent (which is absent), and (ii) under similar conditions. The ethylene/α-olefin interpolymer is typically an ethylene/α-olefin copolymer or terpolymer of ethylene and at least one $C_3$–$C_{10}$ α-olefin. The co-agent can be any compound containing at least two vinyl groups, but preferably is an (meth)acrylate with at least two vinyl groups, e.g., trimethyol propane tri(meth)acrylate. The thermosetting compositions of this invention can include other materials, such as silane functional coupling agents, ultraviolet (UV) light absorbers, infrared (IR) light-blockers, tints and dyes.

DETAILED DESCRIPTION OF THE INVENTION

The homogeneously linear and substantially linear ethylene/α-olefin interpolymers of this invention comprise ethylene and at least one $C_3$–$C_{20}$ α-olefin (preferably an aliphatic α-olefin) comonomer. Examples of the $C_3$–$C_{20}$ α-olefins include propene, 1-butene, 4-methyl-1-pentene, 1-hexene, 1-octene, 1-decene, 1-dodecene, 1-tetradecene, 1-hexadecene, 1-octadecene and 1-eicosene. The α-olefin can also contain a cyclic structure such as cyclohexane or cyclopentane, resulting in an α-olefin such as 3-cyclohexyl-1-propene (allyl-cyclohexane) and vinyl-cyclohexane. Although not α-olefins in the classical sense of the term, for purposes of this invention vinyl acetate, acrylic acid and the class of alkyl acrylates and methacrylates are α-olefins and can be used in place of some or all of the α-olefins described above. Similarly, styrene and its related olefins (e.g., α-methylstyrene, etc.) are α-olefins for purposes of this invention.

By way of definition, as used herein, "interpolymer" means a polymer of two or more comonomers, e.g. a copolymer, terpolymer, etc.

The homogeneous linear or substantially linear polymer is an ethylene polymer prepared using a single site catalyst. By the term homogenous, it is meant that any comonomer is randomly distributed within a given interpolymer molecule and substantially all of the interpolymer molecules have the same ethylene/comonomer ratio within that interpolymer. The DSC melting peak of homogeneous linear and substantially linear ethylene polymers will broaden as the density decreases and/or as the number average molecular weight decreases. However, unlike heterogeneous polymers, when a homogeneous polymer has a melting peak greater than 115° C. (such as is the case of polymers having a density greater than 0.940 g/cm$^3$), such polymers do not additionally have a distinct lower temperature melting peak.

Further, the homogeneous linear or substantially linear ethylene polymers will lack a measurable high density fraction, (i.e. short chain branching distribution as measured by Temperature Rising Elution Fractionation which is described in U.S. Pat. No. 5,089,321, and which is incorporated in its entirety into and made a part of this application), e.g. they will not contain any polymer fraction that has a degree of branching less than or equal to 2 methyl/1000 carbons.

The homogeneous linear or substantially linear ethylene polymers are characterized as having a narrow molecular weight distribution ($M_w/M_n$). For the linear and substantially linear ethylene polymers, the $M_w/M_n$ is from 1.5 to 3.0, preferably from 1.8 to 2.2.

The distribution of comonomer branches for the homogeneous linear and substantially linear ethylene polymers is characterized by its SCBDI (Short Chain Branch Distribution Index) or CDBI (Composition Distribution Branch Index) and is defined as the weight percent of the polymer molecules having a comonomer content within 50 percent of the median total molar comonomer content. The CDBI of a polymer is readily calculated from data obtained from techniques known in the art, such as, for example, temperature rising elution fractionation (abbreviated herein as "TREF") as described, for example, by Wild et al., *Journal of Polymer Science, Poly. Phys. Ed.*, Vol. 20, p. 441 (1982), or in U.S. Pat. No. 4,798,081, both disclosures of which are incorporated herein by reference. The SCBDI or CDBI for the substantially linear polymers useful in the film structures of the present invention is preferably greater than about 50 percent, especially greater than about 70 percent, more preferably greater than about 90 percent.

Homogeneous linear ethylene/α-olefin interpolymers may be prepared using polymerization processes (e.g., as described by Elston in U.S. Pat. No. 3,645,992, the disclosure of which is incorporated herein by reference) which provide a homogeneous short chain branching distribution. In his polymerization process, Elston uses soluble vanadium catalyst systems to make such polymers. However, others such as Mitsui Petrochemical Company and Exxon Chemical Company have used so-called single site catalyst systems to make polymers having a homogeneous linear structure. Homogeneous linear ethylene/α-olefin interpolymers are currently available from Mitsui Petrochemical Company under the tradename "Tafmer" and from Exxon Chemical Company under the tradename "Exact".

In contrast to homogeneous linear ethylene polymers (which have fewer than 0.01 long chain branches per 1000 carbons), substantially linear ethylene polymers are homogeneous polymers having long chain branching. In particular, as used herein, "substantially linear" means that the polymer backbone is substituted with about 0.01 long-chain branches/1000 carbons to about 3 long-chain branches/1000 carbons, preferably from about 0.01 long-chain branches/1000 carbons to about 1 long-chain branch/1000 carbons, and more preferably from about 0.05 long-chain branches/1000 carbons to about 1 long-chain branch/1000 carbons. Long-chain branching is here defined as a chain length of at least about 6 carbon atoms, above which the length cannot be distinguished using $^{13}$C nuclear magnetic resonance spectroscopy. The long chain branches have the same comonomer distribution as the polymer backbone and can be as long as about the same length as the length of the polymer backbone.

The substantially linear ethylene polymers used in the construction of the film structures of this invention are known, and they and their method of preparation are fully described in U.S. Pat. Nos. 5,272,236 and 5,278,272, both of which are incorporated in their entirety into and made a part of this application.

Methods for determining the amount of long chain branching present, both qualitatively and quantitatively, are known in the art. For qualitative methods for determination, see, e.g., U.S. Pat. Nos. 5,272,236 and 5,278,272, the disclosures of both of which are incorporated herein by reference, which disclose the use of an apparent shear stress vs. apparent shear rate plot to identify melt fracture phenomena.

The "Theological processing index" (PI) is the apparent viscosity (in kpoise) of a polymer measured by a gas extrusion rheometer (GER). The gas extrusion rheometer is described by M. Shida, R. N. Shroff and L. V. Cancio in *Polymer Engineering Science*, Vol. 17, No. 11, p. 770 (1977), and in "Rheometers for Molten Plastics" by John Dealy, published by Van Nostrand Reinhold Co. (1982) on pp. 97–99, both publications of which are incorporated by reference herein in their entirety. GER experiments are performed at a temperature of 190° C., at nitrogen pressures between 250 to 5500 psig using about a 7.54 cm diameter, 20:1 L/D die with an entrance angle of 180°. For the substantially linear ethylene polymers useful herein, the PI is the apparent viscosity (inkpoise) of a material measured by GER at an apparent shear stress of $2.15 \times 10^6$ dyne/cm$^2$. The substantially linear ethylene polymers useful herein preferably have a PI in the range of about 0.01 kpoise to about 50 kpoise, preferably about 15 kpoise or less. The substantially linear ethylene polymers useful herein have a PI less than or equal to about 70% of the PI of a comparative linear ethylene polymer (either a Ziegler polymerized polymer or a linear uniformly branched polymer as described by Elston in U.S. Pat. No. 3,645,992) at about the same $I_2$ and $M_w/M_n$.

Substantially linear ethylene polymers will further be characterized as having a resistance to melt fracture. An apparent shear stress versus apparent shear rate plot is used to identify the melt fracture phenomena. According to Ramamurthy in the *Journal of Rheology*, 30(2), 337–357, 1986, above a certain critical flow rate, the observed extrudate irregularities may be broadly classified into two main types: surface melt fracture and gross melt fracture.

Surface melt fracture occurs under apparently steady flow conditions and ranges in detail from loss of specular film gloss to the more severe form of "sharkskin." The onset of surface melt fracture (OSMF) is characterized at the beginning of losing extrudate gloss at which the surface roughness of the extrudate can only be detected by 40× magnification. The critical shear rate at the onset of surface melt fracture for the substantially linear ethylene interpolymers and homopolymers is at least 50 percent greater than the critical shear rate at the onset of surface melt fracture of a comparative linear ethylene polymer (either a Ziegler polymerized polymer or a linear uniformly branched polymer as described by Elston in U.S. Pat. No. 3,645,992) having about the same $I_2$ and $M_w/M_n$.

Gross melt fracture occurs at unsteady extrusion flow conditions and ranges in detail from regular (alternating rough and smooth, helical, etc.) to random distortions. For commercial acceptability, (e.g., in blown films and bags therefrom), surface defects should be minimal, if not absent, for good film quality and properties. The critical shear stress at the onset of gross melt fracture for the substantially linear ethylene polymers used in making the film structures of the present invention is greater than about $4 \times 10^6$ dynes/cm$^2$. The critical shear rate at the onset of surface melt fracture (OSMF) and the onset of gross melt fracture (OGMF) will be used herein based on the changes of surface roughness and configurations of the extrudates extruded by a GER.

For quantitative methods for determining the presence of long chain branching, see, e.g., U.S. Pat. Nos. 5,272,236 and 5,278,272; Randall (Rev. Macromol. Chem. Phys., C29 (2&3), p. 285–297), which discusses the measurement of long chain branching using 13C nuclear magnetic resonance spectroscopy, Zimm, G. H. and Stockmayer, W. H., J. Chem. Phys., 17, 1301 (1949); and Rudin, A., Modem Methods of Polymer Characterization, John Wiley & Sons, New York (1991) pp. 103–112, which discuss the use of gel permeation chromatography coupled with a low angle laser light scattering detector (GPC-LALLS) and gel permeation chromatography coupled with a differential viscometer detector (GPC-DV). Each of the these references is incorporated herein by reference.

The substantially linear ethylene polymers will be characterized as having an $I_{10}/I_2$ (ASTM D-1238), is greater than or equal to 5.63, and is preferably from about 6.5 to 15, more preferably from about 7 to 10. The molecular weight distribution ($M_w/M_n$), measured by gel permeation chromatography (GPC), is defined by the equation:

$$M_w/M_n \leq (I_{10}/I_2) - 4.63,$$

and is preferably between about 1.5 and 2.5. For the substantially linear ethylene polymers, the $I_{10}/I_2$ ratio indicates the degree of long-chain branching, i.e. the larger the $I_{10}/I_2$ ratio, the more long-chain branching in the polymer.

Substantially linear ethylene polymers have a highly unexpected flow property, where the $I_{10}/I_2$ value of the polymer is essentially independent of the polydispersity index (i.e., $M_w/M_n$) of the polymer. This is contrasted with conventional linear homogeneously branched and linear heterogeneously branched polyethylene resins having rheological properties such that to increase the $I_{10}/I_2$ value the polydispersity index must also be increased.

The homogeneous linear or substantially linear ethylene polymer may be suitably prepared using a constrained geometry metal complex, such as are disclosed in U.S. application Ser. No. 545,403, filed Jul. 3, 1990 (EP-A-416,815); U.S. application Ser. No. 702,475, filed May 20, 1991 (EP-A-514,828); as well as U.S. Pat. Nos. 5,470,993, 5,374,696, 5,231,106, 5,055,438, 5,057,475, 5,096,867, 5,064,802, and 5,132,380. In U.S. Serial No. 720,041, filed Jun. 24, 1991, (EP-A-514,828) certain borane derivatives of the foregoing constrained geometry catalysts are disclosed and a method for their preparation taught and claimed. In U.S. Pat. No. 5,453,410 combinations of cationic constrained geometry catalysts with an alumoxane were disclosed as suitable olefin polymerization catalysts. The aforementioned United States Patents are incorporated herein by reference. Homogeneous substantially linear ethylene/α-olefin interpolymers are currently available from The Dow Chemical Company under the tradenames "Engage" and "Affinity".

The preferred melt index of the homogeneously linear and substantially linear ethylene/α-olefin interpolymers (measured by ASTM D-1238, condition 190/2.16 (formerly condition E)) is from about 0.2 g/10 min to 100 g/10 min, more preferably 0.3 to 70 g/10 min, most preferably 0.5 to 30 g/20 min. Typically, the preferred homogeneously linear and substantially linear ethylene polymers used in the practice of this invention do not have any measurable high density fraction, i.e., short chain branching distribution as measured by Temperature Rising Elution Fractionation which is described in U.S. Pat. No. 5,089,321 the disclosure of which is incorporated herein by reference or stated in another manner, these polymers do not contain a polymer fraction that has a degree of branching less than or equal to 2 methyls/1000 carbons. The preferred substantially linear ethylene polymers also consist of a single differential scanning calorimetry (DSC) melting peak.

The density of the substantially linear, ethylene/α-olefin interpolymers used in this invention can vary to convenience but for an ethylene/1-butene or ethylene/1-octene interpolymer, it is typically between about 0.870 and about 0.895 grams per cubic centimeter (g/cm$^3$). Ethylene/1-butene or ethylene/1-octene interpolymers with a density below or above this range are usable in this invention but usually at a cost of haze or tear strength. Generally, as density decreases so does tear strength, and as density increases so does haze.

The crystallinity (measured by DSC) of the interpolymer is about 10 percent or greater, preferably greater than about 15 percent and more preferably greater than about 20 percent. Although higher crystallinity usually means a film with greater tear strength (and thus the use of lower gauge (i.e., thickness)) film, higher crystallinity also usually means more haze. As such the preferred maximum crystallinity of the interpolymer is 40 percent, more preferably 35 percent and most preferably 30 percent.

The homogeneously linear or substantially linear ethylene/α-olefin component is present in the composition of this invention in an amount of at least about 90, preferably at least about 92 and more preferably at least about 93, weight percent, based upon the total weight of the composition. The homogeneously linear or substantially linear ethylene/α-olefin component typically does not exceed about 98, preferably it does not exceed about 97 and more preferably it does not exceed about 96 weight percent, again based upon the total weight of the composition.

The coagent can be any (meth)acrylate, bismaleimide or triallyl (iso)cyanurate compound containing at least two vinyl groups. As here used, "(meth)acrylate" includes both acrylates and methacrylates, and "(iso)cyanurate" includes both cyanurates and isocynurates. Exemplary materials include difunctional coagents such as 1,3-butylene glycol diacrylate or dimethacrylate, 1,4-butanediol diacrylate or dimethacrylate, neopentyl glycol diacrylate or ethacrylate, 1,6-hexane diol diacrylate or methacrylate, cyclohexyl dimethylol diacrylate or dimethacrylate, ethylene dimethacrylate or dimethacrylate, zinc diacrylate or dimethacrylate, m-phenylenebismaleimide and like bismaleimides, etc. Suitable trifunctional coagents include trimethyol propane triacrylate, trimethyol propane trimethacrylate, pentaerythritol triacrylate, triallyl cyanurate, trially isocyanurate, etc. Suitable higher functional coagents include dipentaerythritol pentaacrylate, dipentaerythritol pentamethacrylate, liquid high vinyl 1,2-polybutadiene resins and liquid maleinized 1,2-polybutadiene and the like. Of course, these coagents can be used in combination with one another and/or in combination with cure accelerators and/or scorch retarders.

The coagent is present in the thermosetting composition in an amount of at least about 2, preferably at least about 3 and more preferably at least about 4, percent by weight based upon the total weight of the composition. The amount of coagent in the composition does not exceed typically about 10, preferably it does not exceed about 9 and more preferably it does not exceed about 8, weight percent based upon the total weight of the composition.

The peroxides used in the practice of this invention are preferably free from volatile solvents or inert solids which may negatively impact the clarity of a film made from the composition of this invention. Representative peroxides include those with have half-lives of less than three hours at reaction temperature and include acyl peroxides, such as benzoyl peroxide; dialkyl or aralkyl peroxides such as di-t-butyl peroxide, di-t-amyl peroxide (Luperox™ DTA), dicumyl peroxide, cumylbutyl peroxide, 1,1-di-t-butylperoxy-3,5,5-trimethylcyclohexane, 2,5-dimethyl-2,5-di(t-butyl-peroxy)hexane (Luperox™ 101), 2,5-dimethyl-2,5-di(t-butylperoxy)hexyne-3 (Luperox™ 130), and bis (alpha-t-butylperoxyisopropyl benzene); peroxyesters such as t-butyl perbenzoate, 2,5-dimethylhexyl-2,5-di (perbenzoate), dialkylperoxymonocarbonates and peroxyketals such as 1,1-bis-(t-butylperoxy)-3,3,5-trimethylcyclohexane and 1,1-di(t-butylperoxy)cyclohexane (Lupersol™ 231). Preferred peroxides include Luperox™ 101, 130 and DTA. Lupersol™ 231 is a preferred peroxyketal. Here too, these peroxides, etc. can be used alone or in combination with one another. The Luperox™ and Lupersol™ products are available from Pennwalt Corporation, Lucidol Division.

The amount of peroxide required is an initiating amount. This amount is generally at least about 0.075% by weight based on the total weight of the composition, with a preferred lower limit of about 0. 1%. There is no theoretical upper limit but practical considerations, such as controlling the rate of cure and the cost of initiator, suggest that it should not exceed about 1.0 weight percent, with a preferred upper limit of about 0.7 weight percent. Preferred peroxides include Luperox™ 101, Luperox™ 130 and ditertiary amyl peroxide.

The thermosetting composition of this invention can contain other, optional, components in an aggregate amount of up to about 2 weight percent based upon a total weight of the composition. These optional ingredients include silane functional coupling agents, e.g., any member of the vinyl trialkoxy silane family such as vinyl trimethoxy silane and vinyl triethoxy silane, and UV absorbers such as Tinuven™ 328 and Cyassorb™, and the like.

The compositions of this invention can be formed into films using any conventional technology. Similarly, the films made from the compositions can be laminated to mineral glass and polymer substrates using any conventional technology, e.g. the technology used to make safety glass with PVB as an interlayer.

The compositions of this invention can also be used in many other applications, e.g., clear or pigmented tubing, surface coatings (e.g., to provide a protective layer for photovoltaic cells, or a peelable layer to glass, a package or a label, or to improve the paintability of an otherwise difficult to paint substrate, etc.), impact modification (e.g., to polymethylmethacrylate or clarified polypropylene), lenses (e.g., sidelights, plastic windows for tents and the like, etc.), compatibilizer or modifier for other polymers (e.g., polymer property modification without a reduction in clarity if the refractive indices are similar), fiber optic cables, cure modifier (e.g., for coagents with three or more vinyl groups, after the first two vinyl groups react the remaining vinyl groups are available for secondary curing mechanisms such as UV and radio frequency cures), an integral skin layer for foams, medical parts, dyeable fibers, adhesives, table cloths, latex, elastic films and fibers, calendaring applications, and the like.

The following examples illustrate certain embodiments of this invention. Unless stated otherwise, all parts and percentages are by weight.

EXAMPLES

Ethylene/α-Olefin Interpolymers:

The interpolymers used in the following examples were ethylene/1-octene substantially linear ethylene polymers as identified in Table 1.

TABLE 1

Ethylene/1-Octene Interpolymers

| Description | Melt Index | Density | Tradename | Supplier |
|---|---|---|---|---|
| EAO-1 | 1 | 0.870 | ENGAGE 8100 | DuPont Dow Elastomers |
| EAO-2 | 5 | 0.875 | ENGAGE 8452 | DuPont Dow Elastomers |
| EAO-3 | 1 | 0.885 | ENGAGE 8003 | DuPont Dow Elastomers |
| EAO-4 | 1 | 0.902 | ENGAGE 8480 | DuPont Dow Elastomers |

Comparative Examples 1–4

In this simplest case, pellets of ethylene/α-olefins which meet the requirements of U.S. Pat. No. 5,792,560 were compression molded at 165° C. for 5 minutes at 1 ton, and then for an additional 5 minutes at 10 tons, to form 40 mil thick films. These films were cooled rapidly to room temperature by pressing against thick blocks at room temperature for one minute at 10 tons. The films were tested by ASTM D-624, Method B. Films were also laminated between sheets of float glass at 150° C. for 30 minutes in a convection oven. Laminates were removed from the oven and allowed to equilibrate at room temperature for 24 hours. The results and the calculated THI are shown in Table 2.

TABLE 2

Properties of Compression Molded Films of Neat Ethylene α-Olefins

| Name | EAO used | Tear Strength | Haze | THI |
|---|---|---|---|---|
| Comp. Ex. 1 | EAO-1 | 29.4 | 0.6 | 49 |
| Comp. Ex. 2 | EAO-2 | 32.1 | 0.7 | 46 |
| Comp. Ex. 3 | EAO-3 | 48.6 | 1.5 | 32 |
| Comp. Ex. 4 | EAO-4 | 63.2 | >5.0 | 13 |

The data in this table shows that both tear and haze are dependent on density. Since tear increases linearly with density while haze increases geometrically with density, the highest THI will occur at the lowest density.

Comparative Examples 5–7

This is the preferred embodiment of U.S. Pat. No. 5,792,560. EAO-1 through EAO-3 were imbibed with 1.75% vinyl trimethoxy silane (which functioned as both a coupling agent and as a crosslinker), 0.0875% Luperox™ 101, and 50 ppm dibutyl tin dilaurate. The films were extruded on a single screw extruder equipped with a 3-roll stack to prepare a 40 mil film. The finished films were exposed to 60° C. water for 2 hours to stimulate 2 month storage at room temperature. Films and laminates were then tested as before. Results and THI are shown in Table 3.

TABLE 3

Properties of Extruded Films of EAOs Modified with VTMSO, Peroxide, and Tin

| Name | EAO used | Tear Strength | Haze | THI |
|---|---|---|---|---|
| Comp. Ex. 5 | EAO-1 | 26.8 | 0.7 | 38 |
| Comp. Ex. 6 | EAO-2 | 36.9.1 | 0.8 | 46 |
| Comp. Ex. 7 | EAO-3 | 47.8.6 | 1.5 | 32 |

The silane modification only results in a small increase in tear strength. The impact of the modification on haze is negligible. Further curing reduces the tear strength. This chemistry does not allow hitting the required THI.

Comparative Examples 8–14

U.S. Pat. No. 5,792,560 also teaches the use of peroxide as the sole crosslinker. Films were prepared from EAO-1 and EAO-3 using 1, 2.5, and 5% levels of peroxide. The films of EAO-1 took advantage of the high solubility of organic liquids in polymers of this density to incorporate the peroxide by imbibing. Luperox™ 101 was chosen as the peroxide. Because of the lower solubility of organic liquids in EAO-3, these formulations were prepared in a Haake. Because of the heat generated by the mixing shear in this apparatus, these formulations were prepared with a peroxide with higher activation temperature, i.e., Luperox™ 130.

TABLE 4

Properties of Compression Molded Films Made With Peroxide as the Sole Crosslinker

| Name | EAO used | Wt. % Peroxide | Melt Strength | Haze |
|---|---|---|---|---|
| Comp. Ex. 8 | EAO-1 | 1.0 | 25.8 | Not Measured |
| Comp. Ex. 9 | EAO-1 | 2.5 | 23.2 | Not Measured |
| Comp. Ex. 10 | EAO-1 | 5.0 | 19.9 | Not Measured |
| Comp. Ex. 11 | EAO-3 | 1.0 | 43.7 | Not Measured |
| Comp. Ex. 12 | EAO-3 | 2.5 | 37.8 | Not Measured |
| Comp. Ex. 13 | EAO-3 | 5.0 | 31.5 | Not Measured |

Because the tear strengths were decreased so dramatically and the films were not visibly clearer, laminates were not made from these crosslinked films.

Examples 1–3

EAO-3 was compounded with 7 wt % trimethyol propane trimethacrylate and varying amounts of Luperox™ 130 peroxide in a Haake mixer at 180° F. The peroxide levels were chosen such that the coagent to peroxide ratio was 20:1, 30:1 and 40:1 by weight. The output of the mixer was pressed at 177° C. for 30 minutes at 10 tons. The films were cooled by pressing them at 10 tons for 1 minute at 20° C. This heat cycle was chosen from Moving Die Rheometer (Monsanto MDR 2000) data as the time required at 177° C. to achieve full cure. Because of this high degree of cure, making laminates for haze testing required experimentation. Ultimately it was found that under continued application of 2.5 tons of pressure to the 3 inch by 3 inch laminates for up to 2 hours, would allow sufficient flow to wet the glass sheets and obtain a haze reading.

TABLE 5

Properties of Compression Molded Films Made With Trimethoyol Trimethacrylate

| Name | % Luperox ™ 130 | Tear Strength | Haze | THI |
|---|---|---|---|---|
| EXAMPLE 1 | 0.350 | 49.4 | 0.74 | 67 |
| EXAMPLE 2 | 0.233 | 47.6 | 0.94 | 51 |
| EXAMPLE 3 | 0.175 | 52.9 | 0.73 | 71 |

As can be seen from the data in Table 5, the THI has been increased not so much by an increase in tear strength, but by a decrease in haze. This use of coagent reduces the haze by more than 40% while slightly increasing the tear strength. The combined effect is a THI that is approximately twice the THI of the neat EAO-3 polymer or the EAO-3 polymer modified with VTMOS and peroxide.

Examples 4–8

Further samples were prepared to explore the possible process variables. These were done using EAO-3. The coagent to peroxide ratio was 20:1. The coagent was used at 3 and 5 wt % additions. When the smaller quantities of coagent were used it was possible to blend the liquid coagent and peroxide and imbibe this mix onto the pellets. This was done by pouring the liquid mix onto the pellets and then tumbling the pellets overnight to allow them to uniformly absorb the mix. The imbibed pellets were then fed to the Haake mixer. The mixing temperatures were 180° F. and 270° F. The lower concentration was also prepared by slowly adding the liquid mix slowly to the Haake, after the polymer had melted. The higher coagent level comprised more organic liquid than could be absorbed by the pellets, so these samples were prepared only by the slow addition method. Because the previous films, which had been fully cured during the compression molding cycle, had been difficult to laminate, the outputs from the Haake mixer were pressed at 10 tons and 177° C. for the amount of time determined by the MDR to provide 50% cure. This was typically 15 minutes. The results are reported in the Table 6.

TABLE 6

Properties of Compression Molded Films Made With Trimethyol Trimethacrylate Formulated at Varying Temperatures and Mixing Protocols

| Name | Wt % Coagent | Imbibed or Slow Addition | Mixing Temperature | Tear Strength | Haze | THI |
|---|---|---|---|---|---|---|
| EXAMPLE 4 | 3 | Imbibed | 180 F | 51.1 | 1.24 | 41 |
| EXAMPLE 5 | 3 | Imbibed | 270 F | 50.5 | 0.87 | 58 |
| EXAMPLE 6 | 3 | Slow Add | 180 F | 47.8 | 1.03 | 46 |
| EXAMPLE 7 | 5 | Slow Add | 180 F | 49.0 | .95 | 52 |
| EXAMPLE 8 | 5 | Slow Add | 270 F | 48.1 | .84 | 57 |

These films were much easier to laminate for haze testing.

Table 7 identifies the ethylene/α-olefin interpolymers used in Examples 9–13 and Comparative Examples 15–19.

TABLE 7

Ethylene/α-olefin Interpolymers

| Description | Composition | Melt Index | Density | Percent Crystallinity | Tradename | Supplier |
|---|---|---|---|---|---|---|
| EAO-5 | Ethylene Vinyl Acetate | 2.3 | 0.95 | | LD768.36 | Exxon |
| EAO-6 | Ethylene Acrylic Acid | 5 | 0.938 | 19.5 | PRIMACOR 1430 | Dow Chemical |
| EAO-7 | Ethylene 1-Octene | 1.6 | 0.897 | 30.2 | ENGAGE 8440 | DuPont Dow Elastomers |
| EAO-8 | Ethylene 1-Butene | 1 | 0.883 | 22.0 | Developmental | DuPont Dow Elastomers |
| EAO-9 | Ethylene 1-Butene | 2.2 | 0.888 | 22.1 | EXACT 4011 | Exxon |

Examples 9–13

94.75 parts of the ethylene/α-olefins of Table 7 were formulated with 5 parts of trimethyol proprane trimethacrylate, and 0.25 parts of Luperox™ 130 in a Haake mixer at 270° F. until thoroughly mixed. These formulations were then pressed at 10 tons and 177° C. for the amount of time determined by MDR to provide 50 percent cure. This was typically 15 minutes. These films were cooled rapidly to room temperature by pressing against thick blocks at room temperature for one minute at 10 tons. The films were tested by ASTM D-624, Method B. Films were also laminated between sheets of float glass at 150° C. for 30 minutes in a convection oven. Laminates were removed from the oven and allowed to equilibrate at room temperature for 24 hours. The results and the calculated THI are shown in Table 8.

Comparative Examples 15–19

Pellets of the ethylene/α-olefins of Table 7 were compression molded at 165° C. for 5 minutes at 1 ton, and then for an additional 5 minutes at 10 tons, to form 40 mil thick films. These films were cooled rapidly to room temperature by pressing against thick blocks at room temperature for one minute at 10 tons. The films were tested by ASTM D-624, Method B. Films were also laminated between sheets of float glass at 150° C. for 30 minutes in a convection oven. Laminates were removed from the oven and allowed to equilibrate at room temperature for 24 hours. The results and the calculated THI are shown in Table 8.

TABLE 8

Improvement in THI

| Name | EAO Utilized | Tear Strength | Haze | THI |
|---|---|---|---|---|
| Comp. Ex. 15 | EAO-5 | 45.5 | 2.7 | 16.9 |
| EXAMPLE 9 | EAO-5 | 53.2 | 0.9 | 59.1 |
| Comp. Ex. 16 | EAO-6 | 84.3 | 9.7 | 8.7 |
| EXAMPLE 10 | EAO-6 | 85.0 | 5.2 | 16.3 |
| Comp. Ex. 17 | EAO-7 | 60.8 | 17.9 | 3.4 |
| EXAMPLE 11 | EAO-7 | 61.5 | 5.8 | 10.6 |
| Comp. Ex. 18 | EAO-8 | 49.3 | 1.8 | 27.4 |
| EXAMPLE 12 | EAO-8 | 52.1 | 1.2 | 43.4 |
| Comp. Ex. 19 | EAO-9 | 55.9 | 2.3 | 24.3 |
| EXAMPLE 13 | EAO-9 | 54.7 | 1.5 | 36.5 |

Clearly, the compositions of this invention have Tear Haze Indexes roughly two times higher than film prepared from the identical ethylene/α-olefin without the coagent and peroxide. Similarly, by choosing the optimum crystallinity within the family, virtually any of the families will yield a composition with a THI greater than 50.

Although the invention has been described in considerable detail with reference to the preceding specific embodiments, this detail is for the purpose of illustration and is not to be construed as a limitation on the invention as it is described in the appended claims.

What is claimed is:

1. A thermosetting ethylene/α-olefin composition having a THI value of about 50 or more when compression molded into a film, the composition comprising, in weight percent based upon the total weight of the composition, about:
   A. 90 to about 98 percent of a homogeneously linear or substantially linear ethylene/α-olefin interpolymer with a crystallinity of about 10 percent or more;
   B. 2 to about 110 percent of a (meth)acrylate, bisrnaleimide or triallyl (iso)cyauurate coagent containing at least two vinyl groups; and
   C. at least an initiating amount of an organic peroxide.

2. The composition of claim 1 in which the interpolymer has a crystallinity of about 20 percent or more.

3. The composition of claim 1 in which the coagent is selected from the group consisting of diacrylates, dimethacrylates, triacrylates, trimethacrylates, pentaacrylates, pentamethacrylates, bismaleimides, liquid high vinyl 1,2-polybutadiene resins, liquid maleinized 1,2-polybutadiene and combinations of two or more of these coagents.

4. The composition of claim 3 in which the coagent is present in an amount of at least about 4 weight percent based upon the total weight of the composition.

5. The composition of claim 1 in which the interpolymer is a substantially linear ethylene/α-olefin interpolymer.

6. The composition of claim 1 in which the α-olefin is selected from the group consisting of $C_2$–$C_{10}$ α-olefins.

7. The composition of claim 6 in which the α-olefin is 1-octene.

8. The composition of claim 7 in which the coagent is trimethyol trimethacrylate.

9. A thermosetting ethylene/α-olefin composition having a THI value of about 50 or more when compression molded into a film, the composition made by a process of polymerizing under polymerization conditions about:
   A. 90 to about 98 percent of a homogeneously linear or substantially linear ethylene/α-olefin interpolymer with a crystallinity of about 10 percent or more;
   B. 2 to about 10 percent of a (meth)acrylate, bismaleintide or triallyl (iso)cyanurate coagent containing at least two vinyl groups; and
   C. at least an initiating amount of an organic peroxide.

10. The composition of claim 9 in which the interpolymer has a crystallinity of about 20 percent or more.

11. The composition of claim 9 in which the coagent is selected from the group consisting of diacrylates, dimethacrylates, triacrylates, trimethacrylates, pentaacrylates, pentamethacrylates, bismaleimides, liquid high vinyl 1,2-polybutadiene resins, liquid maleinized 1,2-polybutadiene and combinations of two or more of these coagents.

12. The composition of claim 9 in which the coagent is present in an amount of at least about 4 weight percent based upon the total weight of the composition.

13. The composition of claim 9 in which the interpolymer is a substantially linear ethylene/α-olefin interpolymer.

14. The composition of claim 9 in which the α-olefin is selected from the group consisting of $C_2$–$C_{10}$ α-olefins.

15. The composition of claim 9 in which the peroxide has a half-life of less than three hours at polymerization conditions.

16. The composition of claim 15 in which the peroxide is selected from the group consisting of 2,5-dimethyl-2,5-di(t-butylperoxy)hexane, 2,5-dimethyl-2,5-di(t-butylperoxy)hexyne-3, di-t-amyl peroxide and 1,1-di(t-butylperoxy)cyclohexane.

17. The composition of claim 15 in which the peroxide is present in an amount of at least about 0.1 weight percent based upon the combined weight of the interpolymer and coagent.

18. A film comprising the composition of claim 1.

19. A film comprising the composition of claim 9.

20. Safety glass comprising the film of claim 18 sandwiched between two sheets of mineral glass.

21. Safety glass comprising the film of claim 19 sandwiched between two sheet of mineral glass.

22. The composition of claim 3 in which the peroxide is selected from the group consisting of 2,5-dimethyl-2,5-di(t-butylperoxy)hexane, 2,5-dimethyl-2,5-di(t-butylperoxy)hexyne-3, di-t-amyl peroxide and 1,1-di(t-butylperoxy)cyclohexane.

23. Tubing, surface coatings, lenses, fiber optic cables, foams, fibers, adhesives, latexes or medical devices comprising the composition of claim 1.

24. Tubing, surface coatings, lenses, fiber optic cables, foams, fibers, adhesives, latexes or medical devices comprising the composition of claim 9.

* * * * *

UNITED STATES PATENT AND TRADEMARK OFFICE
CERTIFICATE OF CORRECTION

PATENT NO.     : 6,559,230 B2
DATED          : May 6, 2003
INVENTOR(S)    : Henry G. Heck et al.

It is certified that error appears in the above-identified patent and that said Letters Patent is hereby corrected as shown below:

<u>Column 4,</u>
Line 42, replace "Theological" with -- rheological --.

<u>Column 7,</u>
Line 5, replace "ethacrylate" with -- methacrylate --.

<u>Column 12,</u>
Line 31, replace "110" with -- 10 -- and replace "bisrnaleimide" with -- bismaleimide --.
Line 32, replace "(iso)cyauurate" to -- (iso)cyanurate --.
Line 62, replace "bismaleintide" with -- bismaleimide --.

Signed and Sealed this

Eleventh Day of November, 2003

JAMES E. ROGAN
*Director of the United States Patent and Trademark Office*